A. RAK.
HYDRAULIC WEIGHING MACHINE FOR LIQUIDS.
APPLICATION FILED JUNE 11, 1906.

936,358.

Patented Oct. 12, 1909.

UNITED STATES PATENT OFFICE.

ALOIS RAK, OF ČESKÝ-BROD, AUSTRIA-HUNGARY.

HYDRAULIC WEIGHING-MACHINE FOR LIQUIDS.

936,358.  Specification of Letters Patent.  Patented Oct. 12, 1909.

Application filed June 11, 1906. Serial No. 321,213.

*To all whom it may concern:*

Be it known that I, ALOIS RAK, a subject of the Emperor of Austria-Hungary, residing in Český-Brod, in the Kingdom of Bohemia, Austrian Empire, have invented a new and useful Hydraulic Weighing-Machine for Liquids, of which the following is a specification.

My invention is an improvement in machines for weighing and taking samples of liquids having varying specific densities, especially in the service of large industries, such as sugar mills, breweries, distilleries and the like; in these instances, the usual mechanical weighing machines are not practical, because the reservoir with which the liquid is filled for weighing must be entirely detached from the inlet and outlet pipes while the weighing operation is going on. In my improved apparatus, this is unnecessary, so that time is gained in the operation of weighing liquids and the parts are capable of being made with comparative simplicity and cheapness.

Figure 1:
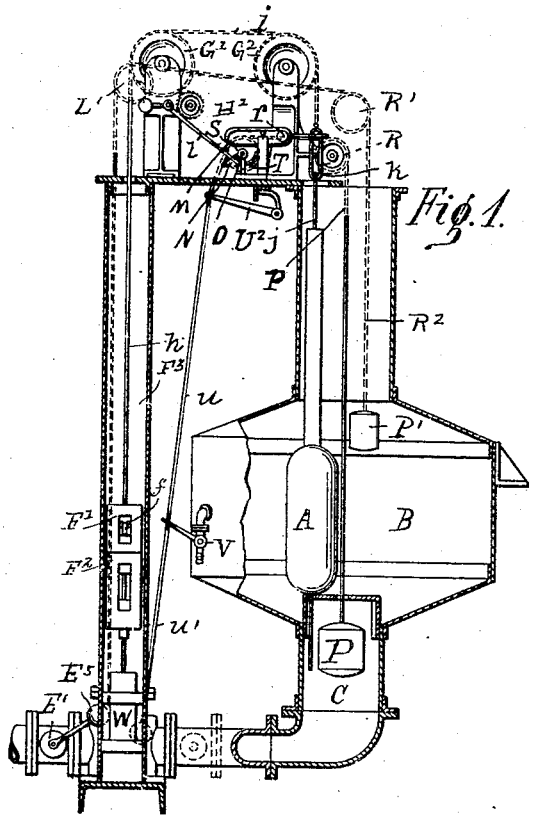
Figure 2:
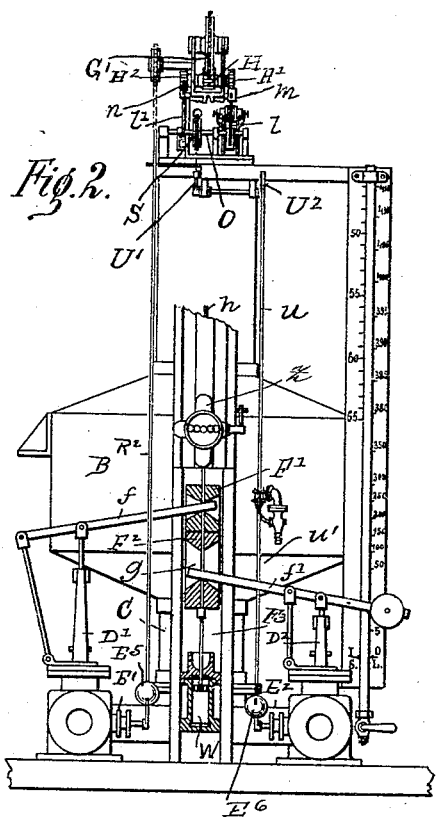
Figure 3:
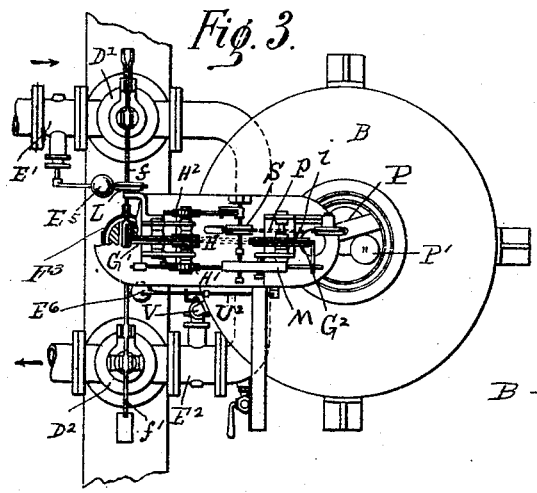

The accompanying drawing will suffice to fully illustrate my invention, Figure 1 being a view partly in side elevation and partly in vertical section, substantially in the axis of a certain reservoir B, of the improved machine; Fig. 2 is a rear view, certain parts appearing in section. Fig. 3 is a top plan view of the improved apparatus, certain parts being in section; and, Figs. 4 and 5 are diagrams illustrating the principle on which the apparatus works.

Figures 4, 5:
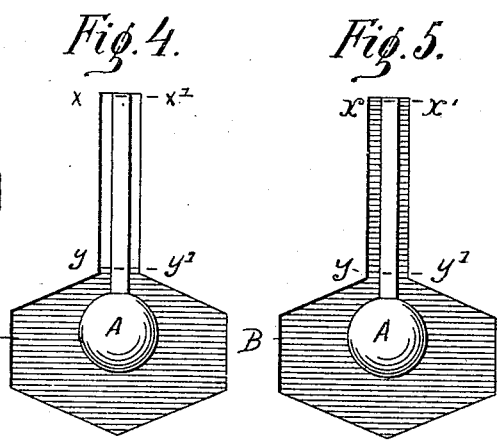

Referring first to Figs. 4 and 5, A is an aerometer, B is a reservoir having an upwardly projecting tube $y$—$x$ and containing a given liquid, the level of the liquid in Fig. 4 being coincident with the mark $y^1$ and that in Fig. 5 being coincident with the mark $x^1$. In view of these figures, the specific density of the liquids to be weighed being known, it is obvious that liquids of different specific densities, when admitted to reservoir B, must assume different elevations between $y^1$ and $x^1$ in order to raise aerometer A. I employ this principle in carrying out my invention and adapt a part corresponding to A to the function of controlling parts which allow the inflow and outflow from B. In the practical application of this principle to my invention, I provide the valves $D^1$ and $D^2$ respectively controlling inlet and outlet pipes which merge into the pipe C, the latter being in communication with the reservoir B; the inlet valve is so controlled as to stop the filling of reservoir B at the precise moment when the aerometer A in reservoir B reaches a predetermined mark, while the outlet valve is so controlled as to stop the emptying of reservoir B at the precise moment when the level of the liquid falls to the mark I shown on the scale, represented in Fig. 2. For this purpose weights $F^1$ and $F^2$ are provided which move vertically in a suitable guideway $F^3$ (Fig. 2), the former being above the latter. A lever $f$ of the second class is connected between its ends to valve $D^1$ while its free end is adapted to move with the weight $F^1$; a lever $f^1$ of the first class carries on one arm thereof a weight $F^1$ and is connected with the valve $D^2$, its other arm projecting into a vertical slot $g$ in the weight $F^2$.

W is a dash-pot for easing the downward movement of the weights. If the weights, being at their upward limit of movement, fall, valve $D^1$ will first close and then when the weights have moved far enough to bring lever $f^1$ at the upper end of slot $g$, valve $D^2$ will be opened. Conversely when the weights are raised, valve $D^1$ will open and valve $D^2$ subsequently close.

The rod $h$ which carries the weights $F^1$ and $F^2$ is suspended from a chain $i$ extending over the sprockets $G^1$ and $G^2$, the other end of said chain being attached to the stem $j$ of the aerometer A, by a link $k$.

H is a pinion in mesh with the sprocket $G^1$ and rotating with pinion H are the reverse ratchets $H^1$ and $H^2$.

$l$ and $l^1$ designate levers carrying pawls $m$ and $n$ engageable with the ratchets; the pawl $m$ engages the ratchet $H^1$ while the aerometer is rising, and the other pawl $n$ engages the ratchet $H^2$ while the aerometer is falling, the parts thus being held against retrograde movement while they are supposed to be rotating in a given direction.

M is a lever in which runs a rolling weight $r$; when the shorter of its arms is raised by the aerometer as the aerometer approaches its upper limit of movement lever $m$ shifts on its fulcrum, the weight $r$ rolls into its longer arm and causes it to engage lever $l$ and thereby throw the pawl $m$ out of engagement with the ratchet $H^1$.

S is a pulley arranged on the spindle O, and over this pulley and a pulley R extends a chain $p$ carrying at one end the float P in the pipe C, and the other end being attached to an arm $U^1$ of a lever whose other arm $U^2$ is connected by a rod $u$ with a valve V of reservoir B; the spindle O carries a lever N which is adapted, when the float P falls to a point where the level of the liquid in reservoir B reaches the mark I to throw the pawl $n$ on the other lever $l$ out of engagement with ratchet wheel $H^2$. A cam T is carried by spindle O and acts to return the lever M to its normal position.

In order to exactly regulate the times when ratchets $H^1$ and $H^2$ are to be released, the throttle valves $E^1$ and $E^2$ are provided so as to positively control the flow during the ends of the filling and emptying periods. The valve $E^1$, which controls the inlet, is connected by a chain $R^2$ with a float $P^1$ in reservoir B, the chain passing over the sprockets $R^1$ and $L^1$, so that when the reservoir fills the float is raised and allows the counterweight $E^5$ to fall by gravity and close valve $E^1$. The throttle valve $E^2$ may be controlled from the float P by means of a rod $u^1$ connecting it with the handle of valve V employed for taking samples, and with a counterweight $E^6$.

Z is a device for automatically registering the number of strokes of the apparatus.

The operation may be described as follows: Assuming that the valves $E^1$ and $D^1$ are opened and that the liquid is flowing into reservoir B, the aerometer A will rise and when it reaches a predetermined mark, according to the density of the liquid being operated upon, it will engage lever M and cause it to be tilted and throw back the pawl $m$. Since the weights $F^1$ $F^2$ fall as the aerometer rises, the valve $D^1$ closes and the valve $D^2$ opens. The closing of valve $D^1$ is slow, and in order to shut off the inlet quickly at the end of the filling period, the throttle $E^1$ is closed. This operation occurs when the reservoir B fills sufficiently to raise float $P^1$ and allow the counterweight $E^5$ to fall and close the valve $E^1$. The throttle valve $E^2$ has been previously opened by the raising of float P in the first part of the filling operation. Valve $D^2$ being now opened, and valve $E^2$ being already open, the liquid in reservoir B flows out, and as it does so the aerometer A falls, as well as the float $P^1$. The falling of aerometer A ultimately results in the closing of valve $D^2$ and the opening of valve $D^1$; at the end of the emptying period, the float P falls, closing valve $E^2$, while valve $E^1$ is quickly opened by the float $P^1$ falling and raising counterweight $E^5$. The falling of float P causes spindle O to rotate and bring the cam T against lever M to reset the same in its original position, and the lever M being thrown out of engagement with lever $l$ of ratchet $H^1$, the pawl on said lever is reëngaged with its ratchet while pawl $n$ on the other lever $l^1$ is thrown out of engagement with its ratchet. Incidentally, during the operation of the apparatus, the valve V is intermittently opened permitting samples to be taken.

Having thus fully described my invention, what I claim as new and desire to secure by Letters Patent is:

The combination of the reservoir, an aerometer located in said reservoir, an inlet and an outlet for the reservoir, a valve for the inlet, another valve for the outlet, said valves being movable independently of each other, vertically moving weights, means for guiding said weights in their vertical movements, levers connected with said weights and with said valves, a flexible connection between the aerometer and the weights, reverse ratchets revoluble together, a rotary part around which said flexible connection is extended and adapted to rotate said ratchets, pawls engageable with said ratchets, means, controlled from said flexible connection, for controlling one pawl, a float in the reservoir, and means, controlled by said float, for controlling the other pawl.

In testimony whereof I affix my signature in presence of two witnesses.

ALOIS RAK.

Witnesses:
ADOLPH FISCHER,
LADISLAV VOJAREK.